(12) United States Patent
Kim

(10) Patent No.: US 7,385,488 B2
(45) Date of Patent: Jun. 10, 2008

(54) REAR WARNING SYSTEM EMPLOYING OUTSIDE MIRROR IN VEHICLE

(75) Inventor: Jong Gyu Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 192 days.

(21) Appl. No.: 11/300,163

(22) Filed: Dec. 13, 2005

(65) Prior Publication Data

US 2007/0091625 A1   Apr. 26, 2007

(30) Foreign Application Priority Data

Oct. 20, 2005   (KR) .................... 10-2005-0099283

(51) Int. Cl.
*B60Q 1/00* (2006.01)
(52) U.S. Cl. .............. 340/435; 340/463; 340/903
(58) Field of Classification Search ............ 340/425.5, 340/438, 435, 903, 463, 468, 471, 472
See application file for complete search history.

(56) References Cited

U.S. PATENT DOCUMENTS

| | | | | |
|---|---|---|---|---|
| 4,943,796 A | * | 7/1990 | Lee | 340/435 |
| 5,313,335 A | | 5/1994 | Gray et al. | |
| 5,373,482 A | * | 12/1994 | Gauthier | 367/99 |
| 5,572,484 A | * | 11/1996 | Gaus et al. | 367/99 |
| 5,734,336 A | * | 3/1998 | Smithline | 340/903 |
| 2002/0003378 A1 | * | 1/2002 | Marcus et al. | 307/10.1 |
| 2002/0186480 A1 | * | 12/2002 | Jacobs | 359/843 |
| 2003/0214738 A1 | * | 11/2003 | Yamada et al. | 359/877 |
| 2004/0080431 A1 | * | 4/2004 | White | 340/932.2 |

FOREIGN PATENT DOCUMENTS

| | | |
|---|---|---|
| JP | 08-241499 | 9/1996 |
| JP | 2005-041376 | 2/2005 |
| JP | 2005-112298 | 4/2005 |
| KR | 1997-0038258 | 7/1997 |

* cited by examiner

*Primary Examiner*—Brent A. Swarthout
(74) *Attorney, Agent, or Firm*—Morgan Lewis & Bockius LLP

(57) ABSTRACT

Disclosed is a rear warning system employing an outside mirror of a vehicle. When a driver moves a vehicle backward and parks the vehicle, the rear warning system warns a driver that the vehicle approaches a person or an obstacle existing behind the vehicle and provides the driver with a visual indication of the distance between the rear end of the vehicle and the person or the obstacle, so that a vehicular collision can be prevented and the vehicle can be stopped or parked at an exact distance, thereby enhancing the convenience in driving the vehicle.

7 Claims, 7 Drawing Sheets

REAR WARNING SYSTEM EMPLOYING OUTSIDE MIRROR IN VEHICLE

CROSS-REFERENCE TO RELATED APPLICATION

This application claims priority to and the benefit of Korean Patent Application 10-2005-0099283 filed in the Korean Intellectual Property Office on Oct. 20, 2005, the entire content of which is incorporated herein by reference.

BACKGROUND OF THE INVENTION

1. Field of the Invention

The present invention relates to a rear warning system employing an outside mirror in a vehicle, and in particular to a rear warning system employing an outside mirror in a vehicle which can inform a driver of the vehicle of the distance between the rear end of the vehicle and a person or an obstacle while the driver moves the vehicle backward and parks the vehicle, so that the vehicle can be prevented from colliding against the person or the obstacle and the vehicle can be parked or stopped at an exact distance.

2. Description of the Related Art

In order to prevent a traffic accident involving people or an accident caused by a vehicular collision against an obstacle when a driver moves a vehicle backward, a rear warning system for measuring the distance between the rear end of the vehicle and a person or an obstacle, and informing the driver of the distance is typically used.

In particular, the above-mentioned rear warning system is very conveniently adopted for a female driver or a novice driver because it notifies the distance of the vehicle from a person or an obstacle existing behind the rear side of the vehicle when the vehicle is moved backward or parked.

The above-mentioned rear warning system for a vehicle may employ an acoustic notification method as shown in FIG. 1, in which a rear sensor of an electromagnetic wave radar type is installed in a space between a trunk door or tail lamps and the rear bumper, and warns the driver by tuning the stress or cycle of beep sound when an obstacle is found, or a visual notification method as shown in FIG. 2, in which a monitor, which is installed at a position to be conveniently identified by a driver within the vehicle, displays the distance of the rear end of the vehicle from an obstacle using digits or bars in multiple steps.

A combined warning method is also used in which the acoustic notification method and the visual notification method are combined to warn a driver using a warning sound and distance indicating bars.

However, it cannot be considered that the above-mentioned rear warning systems perform the rear warning function well.

In order to exhibit a sufficient warning function with a full effect, habits of individual drivers while moving a vehicle backward or parking the vehicle should be grasped.

When moving back and parking a vehicle, some drivers view outside mirrors of the vehicle and the others turn their upper bodies to see the rear side of the vehicle. Under these circumstances, it is considered that an instrument cluster or a rearview mirror of a vehicle and a display mounted in front of the driver are not so effective. Rather, there is a problem in that the cluster, the room mirror and the display have a contrary effect of distracting the driver's attention or deceiving the driver.

Therefore, what is needed is to provide a novel rear warning system which employs a warning method different from those employed in the conventional rear warning system.

SUMMARY OF THE INVENTION

Accordingly, the present invention has been made to solve the above-mentioned problems occurring in the prior art, and an object of the present invention is to provide a rear warning system employing an outside mirror in a vehicle in which the outside mirror automatically indicates the direction of the rear end of the vehicle when a driver manipulates a reverse switch operating unit so as to move a vehicle backward or park the vehicle and at the same time, an LED display and a distance indicator embedded inside an outside mirror is reflected by a tilted mirror to provide the driver with information concerning the rear side of the vehicle, whereby the driver's convenience in driving the vehicle can be further enhanced.

In order to achieve the above-mentioned object there is provided a rear warning system employing an outside mirror in a vehicle comprising: a reverse switch operating unit for operating a reverse gear transmission used when moving a vehicle backward and park the vehicle; an ultrasonic sensor installed on the rear bumper of the vehicle for detecting an object existing behind the rear end of the vehicle and determining distance between the rear end of the vehicle and the object; a main controller for controlling the ultrasonic sensor when the reverse switch operating unit is manipulated; and an outside mirror comprising a frame and a mirror supported by the frame, in which the angle of the outside mirror is adjusted by the main controller and the outside mirror has an LED display and determining distance indicator provided on the frame for indicating the distance between the rear end of the vehicle and an object in multiple steps.

According to another aspect of the present invention, there is provided a rear warning system employing an outside mirror of a vehicle comprising: a reverse switch operating unit for operating a reverse gear transmission used when moving a vehicle backward and park the vehicle; an ultrasonic sensor installed on the rear bumper of the vehicle for detecting an object existing behind the rear end of the vehicle and determining distance between the rear end of the vehicle and the object; a main controller for controlling the ultrasonic sensor when the reverse switch operating unit is manipulated; an outside mirror comprising a frame and a mirror supported by the frame, in which the angle of the outside mirror is adjusted by the main controller and the outside mirror has an LED display and a distance indicator provided on the frame for indicating the distance between the rear end of the vehicle and an object in multiple steps; a side mirror unit installed between the main controller and the outside mirror to control the angle of the outside mirror, and a sensor for receiving a signal concerning the input condition of the reverse gear transmission from the main controller and for recognizing the angle of the outside mirror and sending a signal concerning the angle to the side mirror unit.

According to an embodiment of the present invention, the mirror is turned in such a way that while the vehicle moves forward, a margin part is provided at the upper part of the frame of the outside mirror, whereas while the vehicle is moved backward and parked, the margin part is provided at the lower part of the frame.

According to another embodiment of the present invention, while the vehicle moves forward, the LED display and the distance indicator are positioned inside the mirror, whereas while the vehicle is moved backward and parked, the LED display and the distance indicator are positioned outside the mirror.

According to another embodiment of the present invention, the LED display and the distance indicator are embedded inside the frame of the outside mirror.

According to another embodiment of the present invention, the LED display and the distance indicator are operated only when the reverse switching operating unit is manipulated.

Furthermore, according to another embodiment of the preset invention, the distance indicator indicates information upside down.

Still further, according to another embodiment of the present invention, the downward tilt angle of the outside mirror is set to 15° in relation to a vertical plane.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1A:
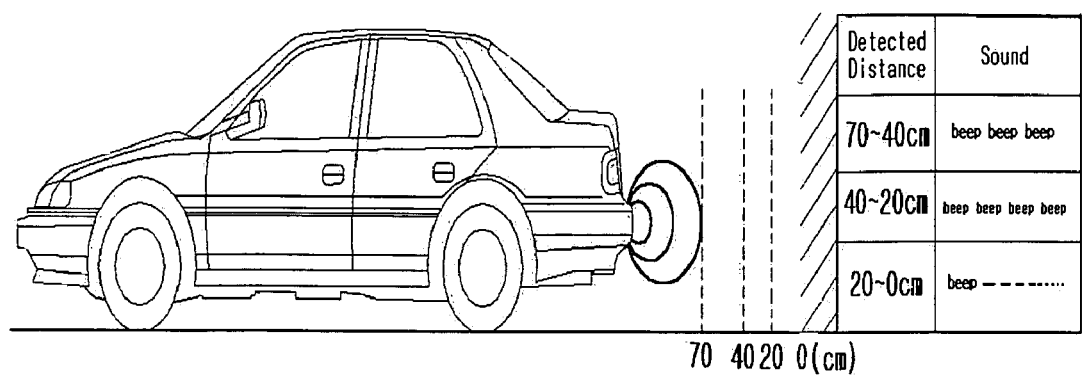
FIG. 1a shows a conventional rear warning system of a vehicle employing an acoustic notification method.
Figure 1B:
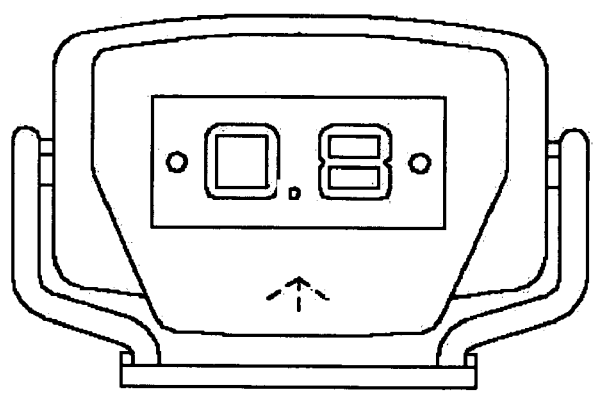
FIG. 1b shows a conventional rear warning system of a vehicle employing a visual notification method.

Hereinafter, a preferred embodiment of the present invention will be described with reference to the accompanying drawings. In the following description and drawings, the same reference numerals are used to designate the same or similar components, so that repeated description on the same or similar components will be omitted.

Figure 2:
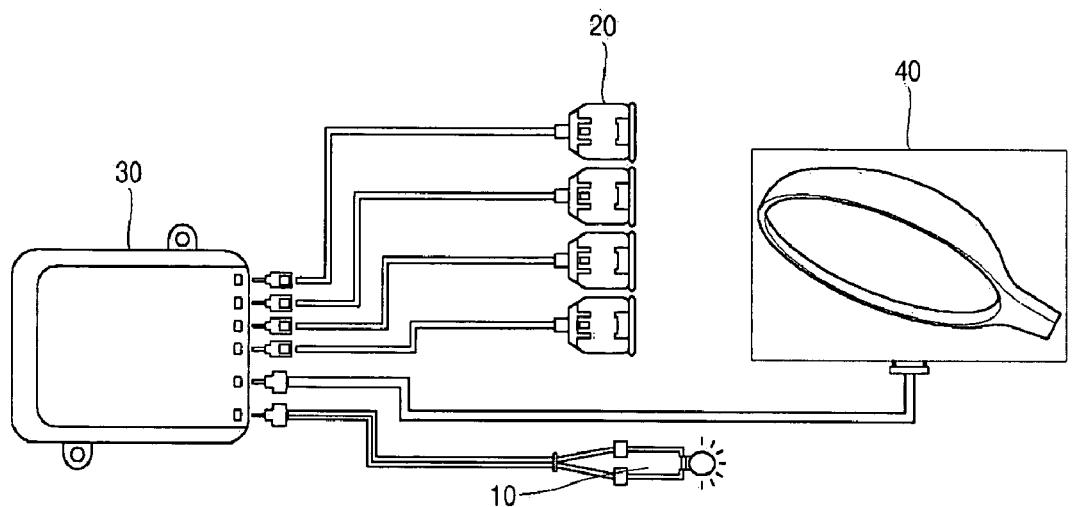
FIG. 2 is a schematic view illustrating an embodiment of a rear warning system employing an outside mirror in a vehicle according to the present invention.

Referring to FIG. 2, which shows an embodiment of a rear warning system using an outside mirror of a vehicle, the rear warning system comprises a reverse switch operating unit 10 for moving a vehicle backward, an ultrasonic sensor 20, a main controller 30, and an outside mirror 40.

The reverse switch operating unit 10 is provided within the cabin of a vehicle in order to be manipulated by a driver so as to operate a reverse gear transmission when the driver moves the vehicle backward and parks the vehicle.

The ultrasonic sensor 20, operated when the driver manipulates the reverse switch operating unit 10, is mounted on the rear bumper of the vehicle and serves to detect and notify an object existing behind the vehicle and the distance between the rear end of the vehicle and the object; two or more such ultrasonic sensors may be provided on the vehicle.

The main controller 30 is connected with the reverse switch operating unit 10, the ultrasonic sensors 20 and the outside mirror 40 to respectively control them.

Therefore, when the driver manipulates the reverse switch operating unit 10, the main controller 30 transmits signals to the ultrasonic sensors 20 in response to the manipulation, then receives signals indicating an object existing behind the vehicle and indicating the distance between the rear end of the vehicle and the object, and then transmits the signals to the outside mirror 40.

The outside mirror 40 has a frame 41 for surrounding a member (not shown) for tuning the angle of a mirror 43 while carrying the mirror 43.

The angle of the mirror 43 is controlled by the main controller 30 and is set to be controlled at the time of moving the vehicle backward and parking the vehicle.

The frame 41 of the outside mirror 40 has an LED display 42 and a distance indicator 44 at the internal lower end thereof for indicating the distance between the rear end of the vehicle and an object in multiple steps.

Therefore, when the vehicle is moved backward or parked, the LED display 42 and the distance indicator 44 indicate the distance between the rear end of the vehicle and the object so as to inform the driver of the distance.

Figure 3:
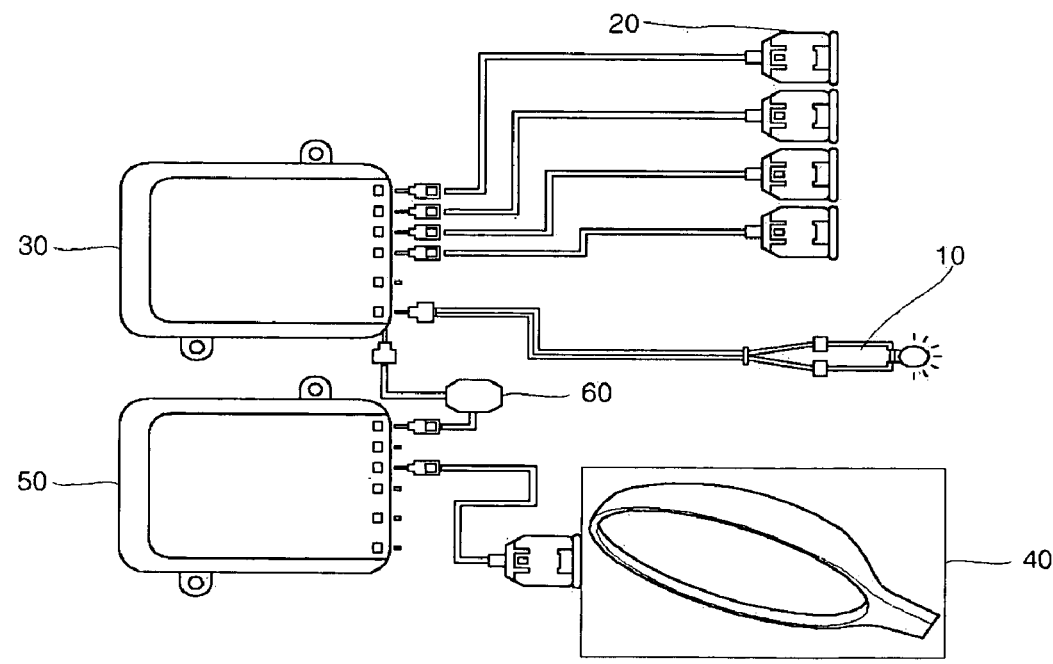
FIG. 3 is a schematic view illustrating another embodiment of the present invention of a rear warning system employing an outside mirror in a vehicle according to the present invention.

Referring to FIG. 3 which illustrates another embodiment of a rear warning system using an outside mirror in a vehicle according to the present invention, the rear warning system further comprises a side mirror unit 50 and a sensor 60, beyond the reverse switch operating unit 10, the ultrasonic sensor 20, the main controller 30, and the outside mirror 40 described above with reference to the above-mentioned embodiment.

Because the components of the reverse switch operating unit 10, the ultrasonic sensor 20, the main controller 30 and the outside mirror 40 have been described above, further description thereof is omitted and the side mirror unit 50 and the sensor 60 are only described hereafter.

The side mirror unit 50 is installed between the main controller 30 and the outside mirror 40, in which when the reverse switch operating unit 10 is manipulated, the side mirror unit 50 receives a signal from the main controller 30 so as to tune the presently set downward angle of the outside mirror to an angle that allows the driver to recognize the situation behind the rear side of the vehicle.

Although the downward angle of the outside mirror 40 is typically set to 15° with reference to a vertical angle, it is possible to tune the angle to another angle as desired depending on the type of vehicle.

Therefore, the driver recognizes the distance between the rear end of the vehicle and an object, which is indicated by the LED display 42 and the distance indicator 44 provided on the outside mirror 40, so as to properly cope with a given situation while moving the vehicle backward or parking the vehicle.

The sensor 60 is provided between the main controller 30 and the side mirror unit 50, and receives the input condition for the reverse gear from the main controller 30 to determine and transmit the present angle of the outside mirror 40 to the side mirror unit 50 as desired.

Figure 4A:
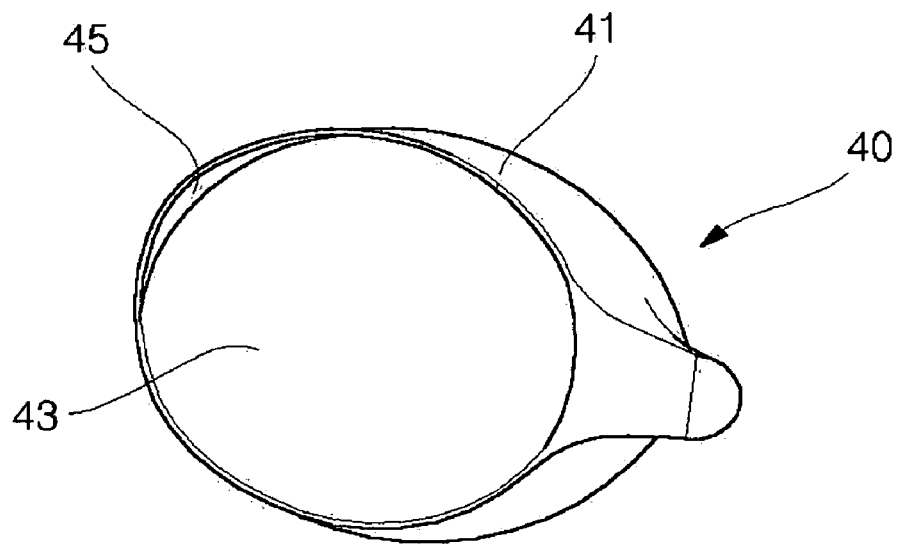
FIGS. 4a to 4c show the changing postures of an outside mirror in a rear warning system using the outside mirror of a vehicle according to the present invention, when the vehicle is driven forward, moved backward and parked, respectively.
Figure 4B:
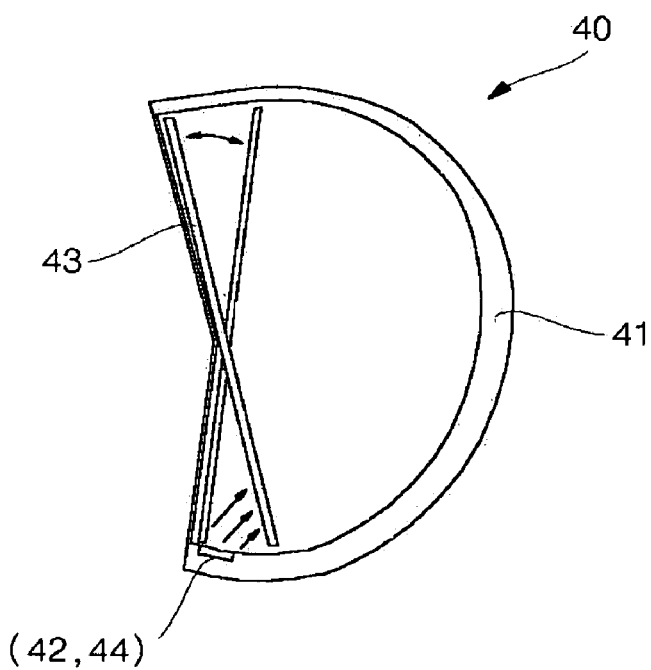
Figure 4C:
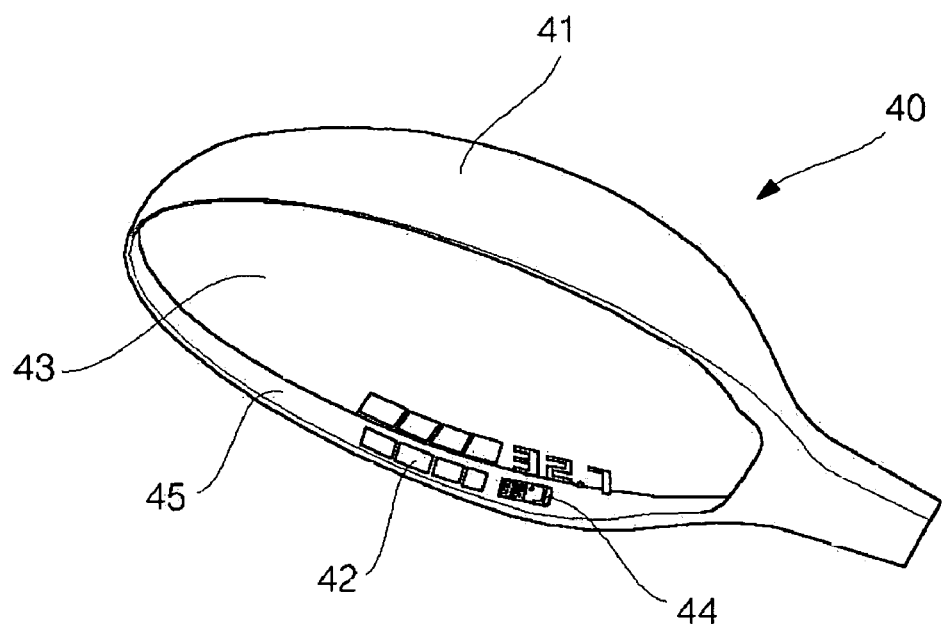

FIGS. 4a to 4c show the changing posture of an outside mirror of a vehicle in a rear warning system employing the outside mirror according to the present invention, when the vehicle is moved forward and when the vehicle is moved backward or parked, respectively.

As shown in the drawings, a margin part 45 is formed between one end of the frame 41 of the outside mirror 40 and the mirror 43.

Accordingly, the margin part is adapted to be arranged in such a manner that the margin space 45 is formed at the upper part of the frame 41, as shown in FIG. 4a, while the vehicle is moved forward whereas the margin space 45 is formed at the lower part of the frame 41, as shown in FIG. 4c, while the vehicle is moved backward or parked.

That is, as shown in FIG. 4b, when the vehicle is moved forward, the mirror 43 is adapted to be in a tilted position so that the margin part 45 is formed at the upper part of the frame 41 in order to avoid a dangerous condition, such as an optical illusion caused by reflection from the mirror 43, and when the driver manipulates the reverse switch operating unit 10 so as to move the vehicle backward or park the vehicle, the mirror 43 is adapted to rotate to the downward angled position so that the margin part 45 is formed at the lower part of the frame 41.

Therefore, if the mirror 43 rotates to the downward angled position and thus the margin part 45 is formed at the lower part of the frame 41, an LED information indication unit provided at the margin part 45 and formed by the LED display 42 and the distance indicator 44 is reflected by the mirror 45, so that the driver can be informed of and recognize a situation behind the vehicle.

Here, the LED display 42 and the distance indicator 44 are embedded inside the frame 45 of the outside mirror 40, so that while the vehicle is moved forward, the LED display 42 and the distance indicator 44 are positioned inside the mirror 43, whereas while the vehicle is moved backward or parked, the LED display 42 and the distance indicator 44 are positioned outside the mirror 43.

In addition, it is preferable that the LED display 42 and the distance indicator 44 are controlled to operate only when the reverse switch operating unit 10 is manipulated for moving the vehicle backward or parking the vehicle so that they do not operate while the vehicle is moved forward, whereby they do not disturb the driver while driving.

The distance indicator 44 displays information upside down inverted condition at the margin part 45 of the frame 41 so that the driver can view the information displayed by the distance indicator 44 in an upright condition through the mirror 43.

The information represented by the LED display 42 and the distance indicator 44 is reflected by the mirror 43 toward an area where they do not obstruct the rearward field of vision of the driver while the vehicle is moved backward or parked, thereby positively helping the driver while driving.

The operation of the embodiments of the present invention, including the components described above, is now described.

Figure 5:
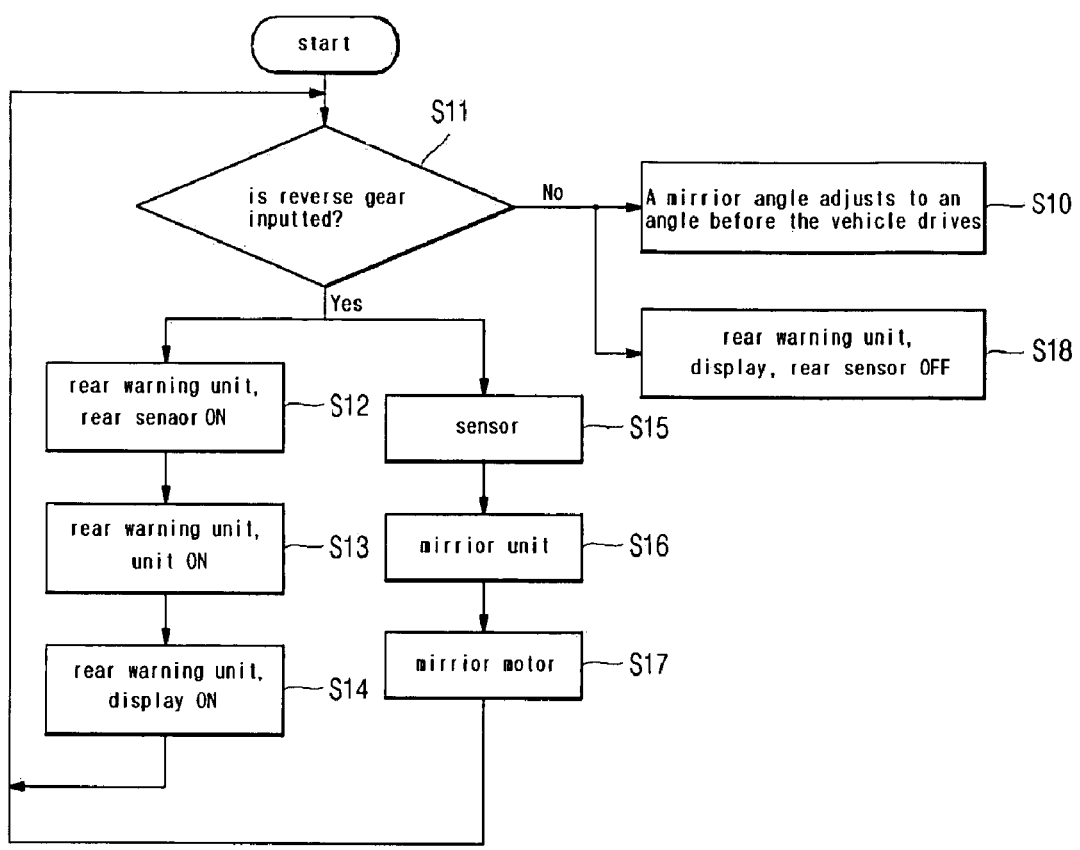
FIG. 5 is an operating flowchart of a rear warning system employing an outside mirror of a vehicle according to the present invention.

Referring to FIG. 5 which shows an operating flowchart of a rear warning system employing an outside mirror in a vehicle, if a driver manipulates the reverse switch operating unit 10 so as to move the vehicle backward or park the vehicle after the vehicle is moved forward and the mirror 43 maintains its angle before the driver recognizes the situation behind the rear side of the vehicle (S10, S11), the main controller 30 renders the ultrasonic sensor 20 installed at the rear part of the vehicle to detect whether an object exists behind the vehicle, and determine how far the object is spaced from the rear end of the vehicle and to transmit this detected information (S12).

The sensor 60 or the side mirror unit 50, which is turned on simultaneously when the reverse switch operating unit 10 is manipulated, receives information from the ultrasonic sensor 20 (S13, S14, 115) and concurrently detects the present angle of the outside mirror 40. Then, the sensor 60 or the side mirror unit 50 drives the motor (not shown) of the side mirror unit 50, thereby rotating the mirror 43 to a predetermined angle, so that the information is presented to the driver 44 by the LED display 42 and the distance indicator 44 of the LED information indication unit (S16, S17).

Upon appearing at the margin part 45 of the frame 41 after the mirror 43 is rotated, the LED information indication unit presents a proper warning sound and/or light, and indicates the distance of the rear end of the vehicle from an object each time the rear end of the vehicle approaches an object behind the vehicle (S18).

Figure 6A:
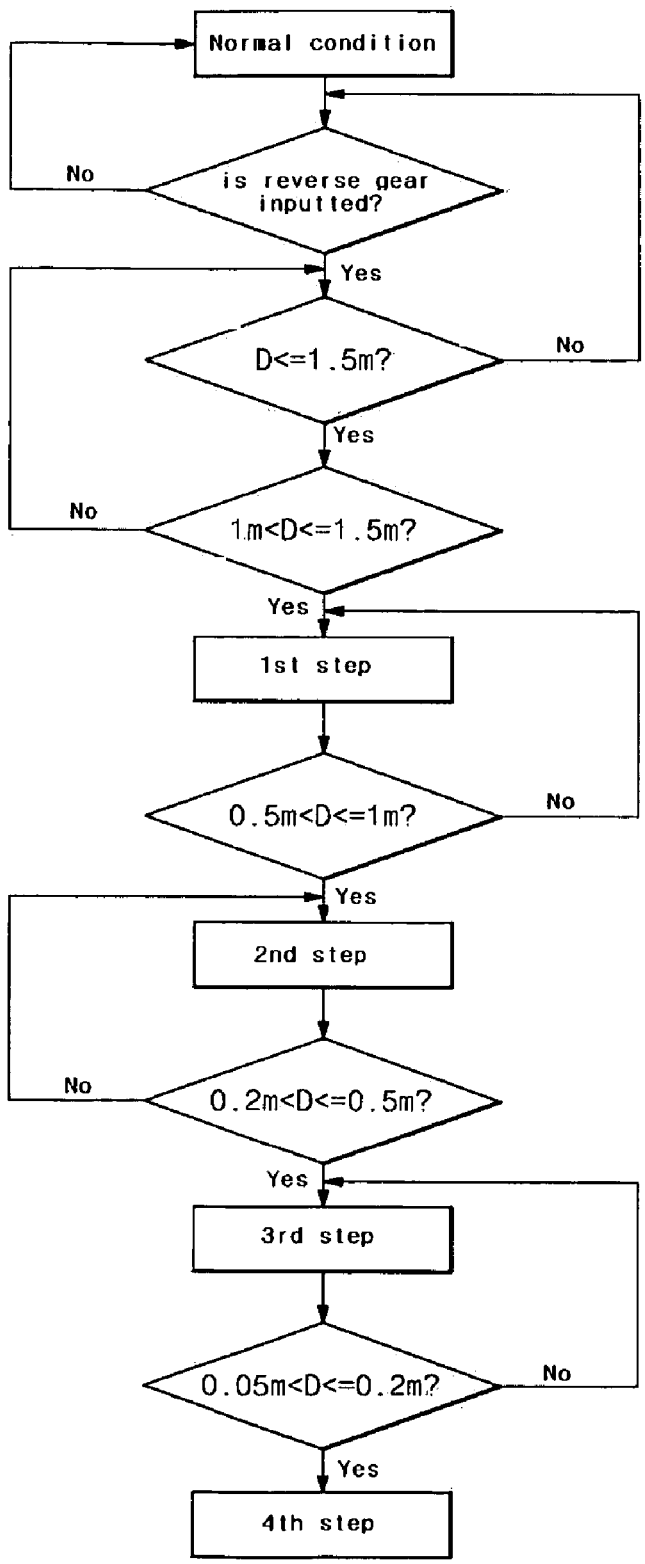
FIGS. 6a and 6b show operating conditions of an LED display unit and a distance indicator in a rear warning system employing an outside mirror in a vehicle according to the present invention.
Figure 6B:
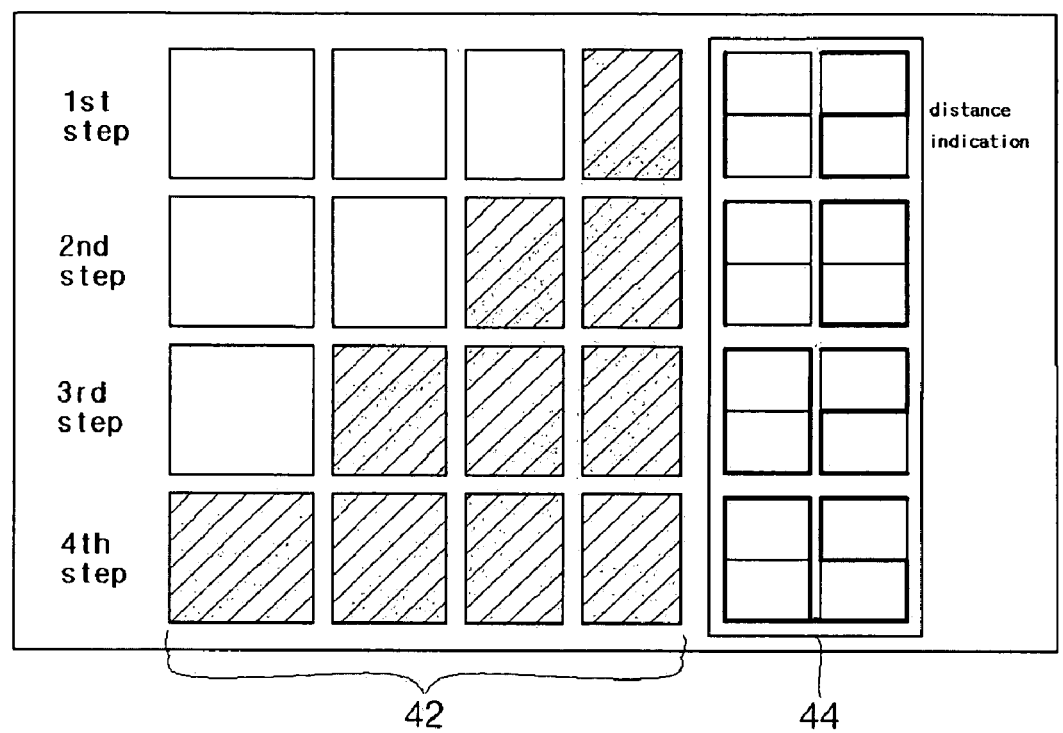

As can be seen from FIGS. 6a and 6b, which illustrate a flowchart and a diagram for indicating a situation in which the rear end and of the vehicle and an object come close to each other through four steps, if the driver manipulates the reverse switch operating unit 10, at first step, a light sign for notifying that the distance between the rear end of the vehicle and the object is in the range of 1 m to 1.5 m (1 m<D<1.5 m) is turned on through the distance indicator 44, one of four warning lamps of the LED display 42 is turned on, and at the same time, a warning is sounded at a predetermined interval.

Thereafter, at second step, a light sign for notifying that the distance between the rear end of the vehicle and the object is in the range of 0.5 m to 1 m (0.5 m<D<1 m) is turned on through the distance indicator 44, two of four warning lamps of the LED display are turned on, and at the same time, a warning is sounded at an interval shorter than that of the first step.

At third step, a light sign for notifying that the distance between the rear end of the vehicle and the object is in the range of 0.2 m to 0.5 m (0.2 m<D<0.5 m) is turned on through the distance indicator 44, three of four warning lamps of the LED display are turned on, and at the same time, a warning is sounded at an interval shorter than that of the second step.

At third step, a light sign for notifying that the distance between the rear end of the vehicle and the object is in the range of 0.05 m to 0.2 m (0.05 m<D<0.2 m) is turned through the distance indicator 44, all of four warning lamps of the LED display are turned on, and at the same time, a warning is continuously sounded without an interval.

Here, the symbol "D" is an optionally set value.

As described above, if a rear warning system employing an outside mirror in a vehicle according to the present invention is used, it is possible to prevent a vehicular collision and to park or stop a vehicle at an exact distance from an object, thereby further enhancing the convenience of a driver in driving a vehicle.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A rear warning system employing an outside mirror of a vehicle comprising:
   a reverse switch operating unit for operating a reverse gear transmission used when moving a vehicle backward and park the vehicle;
   an ultrasonic sensor installed on the rear bumper of the vehicle for determining an object existing behind the vehicle and detecting distance between the rear end of the vehicle and the object;
   a main controller for controlling the ultrasonic sensor when the reverse switch operating unit is manipulated; and
   an outside mirror comprising a frame and a mirror supported by the frame, in which the angle of the outside mirror is adjusted by the main controller and the outside mirror has an LED display and a distance indicator provided on the frame for indicating the distance between the rear end of the vehicle and the object in multiple steps, wherein while the vehicle is moved forward, the LED display and the distance indicator are positioned inside the mirror, whereas while the vehicle is moved backward and parked, the LED display and the distance indicator are positioned outside the mirror.

2. A rear warning system employing an outside mirror of a vehicle comprising:
   a reverse switch operating unit for operating a reverse a gear transmission used when moving a vehicle backward and park the vehicle;
   an ultrasonic sensor installed on the rear bumper of the vehicle for detecting an object existing behind the vehicle and determining the distance between the rear end of the vehicle and the object;
   a main controller for controlling the ultrasonic sensor when the reverse switch operating unit is manipulated;
   an outside mirror formed by a frame and a mirror supported by the frame, in which the angle of the outside mirror is adjusted by the main controller and the outside mirror has an LED display and a distance indicator provided on the frame for indicating the distance between the rear end of the vehicle and an object in multiple steps, wherein while the vehicle is moved forward, the LED display and the distance indicator are positioned inside the mirror, whereas while the vehicle is moved backward and parked, the LED display and the distance indicator are positioned outside the mirror;
   a side mirror unit installed between the main controller and the outside mirror to control the angle of the outside mirror; and
   a sensor for receiving a signal concerning the input condition of the reverse gear transmission from the main controller and for recognizing the angle of the outside mirror and sending a signal concerning the angle to the side mirror unit.

3. A rear warning system as claimed in claim 1 or 2, wherein the mirror is rotated in such a way that while the vehicle is moved forward, a margin part is provided at the upper part of the frame of the outside mirror, whereas while the vehicle is moved backward and parked, the margin part is provided at the lower part of the frame.

4. A rear warning system as claimed in claim 1 or 2, wherein the LED display and the distance indicator are embedded inside the frame of the outside mirror.

5. A rear warning system as claimed in claim 1 or 2, wherein the LED display and the distance indicator are operated only when the reverse switching operating unit is manipulated.

6. A rear warning system as claimed in claim 1 or 2, wherein the distance indicator indicates information upside down.

7. A rear warning system as claimed in claim 1 or 2, wherein the downward tilt angle of the outside mirror is set to 15° in relation to a vertical plane.

* * * * *